(12) United States Patent
Lu et al.

(10) Patent No.: US 11,160,101 B2
(45) Date of Patent: Oct. 26, 2021

(54) METHOD AND DEVICE FOR ENHANCING DOWNLINK CONTROL CHANNEL

(71) Applicant: Telefonaktiebolaget LM Ericsson (publ), Stockholm (SE)

(72) Inventors: Qianxi Lu, Beijing (CN); Jianfeng Wang, Beijing (CN); Huaisong Zhu, Beijing (CN); Zhan Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 17 days.

(21) Appl. No.: 16/463,543

(22) PCT Filed: Nov. 24, 2017

(86) PCT No.: PCT/CN2017/112827
§ 371 (c)(1),
(2) Date: May 23, 2019

(87) PCT Pub. No.: WO2018/095402
PCT Pub. Date: May 31, 2018

(65) Prior Publication Data
US 2019/0281620 A1    Sep. 12, 2019

(30) Foreign Application Priority Data

Nov. 25, 2016  (WO) .............. PCT/CN2016/107211

(51) Int. Cl.
*H04W 72/12*     (2009.01)
*H04W 72/04*     (2009.01)
*H04L 5/00*      (2006.01)

(52) U.S. Cl.
CPC ....... *H04W 72/1273* (2013.01); *H04L 5/0053* (2013.01); *H04W 72/042* (2013.01); *H04W 72/0446* (2013.01); *H04W 72/0493* (2013.01)

(58) Field of Classification Search
CPC .......... H04W 72/1273; H04W 72/042; H04W 72/0446; H04W 72/0493; H04L 5/0053
See application file for complete search history.

(56) References Cited

U.S. PATENT DOCUMENTS 9,313,777 B2    4/2016  Horiuchi et al.
2011/0222491 A1*  9/2011  Vajapeyam ........... H04L 1/0072
                                                    370/329
(Continued)

FOREIGN PATENT DOCUMENTS

CN         103563468 A     2/2014

OTHER PUBLICATIONS

Huawei et al., "Control channel design for URLLC", 3GPP TSG RAN WG1 Meeting #87, R1-1611221. Reno, Nevada, USA, Nov. 14-18, 2016. (5 pages) (Year: 2016).*

(Continued)

*Primary Examiner* — Ayaz R Sheikh
*Assistant Examiner* — Faiyazkhan Ghafoerkhan
(74) *Attorney, Agent, or Firm* — Rothwell, Figg, Ernst & Manbeck, P.C.

(57) ABSTRACT

Embodiments of the disclosure generally relate to enhancement of downlink control channel. A network device maps control information to a resource region. The control information is associated with data to be transmitted at a first subframe of a first cell. The resource region crosses a plurality of subframes and/or a plurality of cells. Then, the network device transmits the control information on the resource region to a terminal device.

6 Claims, 5 Drawing Sheets

(56) References Cited

U.S. PATENT DOCUMENTS

| | | | |
|---|---|---|---|
| 2011/0274060 A1* | 11/2011 | Luo | H04L 5/0094 370/329 |
| 2013/0279481 A1 | 10/2013 | Horiuchi et al. | |
| 2013/0301431 A1* | 11/2013 | Izzo | H04L 41/5067 370/252 |
| 2013/0301434 A1* | 11/2013 | Krishnamurthy | H04B 7/0617 370/252 |
| 2015/0163790 A1 | 6/2015 | Lee et al. | |
| 2015/0304960 A1* | 10/2015 | Yang | H04W 52/244 370/252 |
| 2017/0339677 A1* | 11/2017 | Rico Alvarino | H04W 16/02 |
| 2018/0070369 A1* | 3/2018 | Papasakellariou | H04W 56/00 |
| 2018/0192407 A1* | 7/2018 | Chen | H04W 72/082 |
| 2018/0205513 A1* | 7/2018 | Yamamoto | H04L 5/0007 |
| 2019/0306840 A1* | 10/2019 | Taherzadeh Boroujeni | H04W 72/042 |
| 2019/0387533 A1* | 12/2019 | Papasakellariou | H04W 72/0406 |
| 2020/0068592 A1* | 2/2020 | Papasakellariou | H04W 72/1215 |

OTHER PUBLICATIONS

International Search Report and Written Opinion dated Feb. 23, 2018 issued in International Application No. PCT/CN2017/112827. (7 pages).
Huawei et al., "Control channel design for URLLC", 3GPP TSG RAN WG1 Meeting #87, R1-1611221. Reno, Nevada, USA, Nov. 14-18, 2016. (5 pages).
Panasonic, "Performance evaluation on M-PDCCH", 3GPP TSG RAN WG1 Meeting #82, R1-153963, Beijing, China, Aug. 24-28, 2015. (9 pages).
Ericsson, "Summary of e-mail discussions on downlink control signaling", TSG-RAN WG1 #87, R1-1612908, Reno, NV, USA, Nov. 14-18, 2016. (37 pages).
Extended European Search Report dated Oct. 21, 2019 issued in European Patent Application No. 17875017.0. (10 pages).

* cited by examiner

METHOD AND DEVICE FOR ENHANCING DOWNLINK CONTROL CHANNEL

CROSS REFERENCE TO RELATED APPLICATION(S)

This application is a 35 U.S.C. § 371 National Stage of International Patent Application No. PCT/CN2017/112827, filed Nov. 24, 2017, designating the United States and claiming priority to International Application no. PCT/CN2016/107211, filed on Nov. 25, 2016. The above identified applications are incorporated by reference.

TECHNICAL FIELD

Embodiments of the present disclosure generally relate to the field of communications, and more particularly, to a method and device for enhancing downlink control channel.

BACKGROUND

With the development of communication technologies, multiple types of services or traffic have been proposed, for example, enhanced mobile broadband (eMBB) generally requiring high data rate, massive machine type communication (mMTC) typically requiring long battery lifetime, and ultra-reliable and low latency communication (URLLC). These services require different levels of Quality of Service (QoS), for instance, delay, data rate, packet loss rate, and so on.

Generally, mission critical communication, such as URLLC, requires both low latency and high reliability. Simultaneously achieving such high demands on both reliability and latency may impact many layers and components of both Radio Access Network (RAN) and core network.

Considering control channel reception is the premise of data channel reception, in order to satisfy the requirements on the data channel, i.e., Block Error Ratio (BLER) is not larger than $10^{-5}$ for URLLC, the BLER of the downlink control channel should not be larger than $10^{-5}$ error rate first. However, based on the conventional channel design, for example, the design in LTE, even configured with the highest physical channel resources consumption, the BLER is hard to reach the requirement of $10^{-5}$ with the target SNR.

SUMMARY

In general, embodiments of the present disclosure provide a solution for improving robustness of downlink control channel.

In a first aspect, a method implemented at a network device is provided. A network device maps control information to a resource region. The control information is associated with data to be transmitted at a first subframe of a first cell. The resource region crosses a plurality of subframes and/or a plurality of cells. Then, the network device transmits the control information on the resource region to a terminal device. The corresponding computer program is also provided.

In one embodiment, the mapping control information to a resource region comprises: mapping the control information to one or more control channel elements; and mapping the one or more control channel elements to at least one of: resource elements of the first subframe and a second subframe of the first cell, and resource elements of subframes of the first cell and a second cell.

In one embodiment, the mapping the control information to control channel elements comprises: mapping the control information to the control channel elements based on a self-contained encoding scheme or a combined encoding scheme.

In one embodiment, the method may further comprise: determining a type of the data to be transmitted; and in response to determining the type belonging to mission critical communication, mapping the control information to the resource region.

In one embodiment, the method may further comprise: transmitting, to the terminal device, mapping information about at least one of: subframes to which the control information is mapped, cells to which the control information is mapped, control channel elements or resource elements of subframes to which the control information is mapped, control channel elements or resource elements of cells to which the control information is mapped, an encoding scheme used in the mapping, a numerology of the resource region, and a search space of the resource region.

In a second aspect, a method implemented at a terminal device is provided. The terminal device determines a resource region that carries control information. The control information is associated with data transmitted at a first subframe of a first cell. The resource region crosses a plurality of subframes and/or a plurality of cells. Then the terminal device detects, on the resource region, the control information transmitted from a network device. The corresponding computer program is also provided.

In one embodiment, the determining a resource region carrying control information comprises: receiving, from the terminal device, mapping information about at least one of: subframes to which the control information is mapped, cells to which the control information is mapped, control channel elements or resource elements of subframes to which the control information is mapped, control channel elements or resource elements of cells to which the control information is mapped, an encoding scheme used in the mapping, a numerology of the resource region, and a search space of the resource region; and determining the resource region based on the mapping information.

In one embodiment, the detecting the control information comprises: decoding the control information based on a self-contained encoding scheme or a combined encoding scheme.

In a third aspect, an apparatus implemented at a network device is provided. The apparatus includes a mapping unit and a transmitting unit. The mapping unit is configured to map control information to a resource region, the control information being associated with data to be transmitted at a first subframe of a first cell, and the resource region crossing a plurality of subframes and/or a plurality of cells. The transmitting unit is configured to transmit the control information on the resource region to a terminal device.

In a fourth aspect, an apparatus implemented at a terminal device is provided. The apparatus includes a determining unit and a detecting unit. The determining unit is configured to determine a resource region carrying control information, the control information being associated with data transmitted at a first subframe of a first cell, and the resource region crossing a plurality of subframes and/or a plurality of cells. The detecting unit is configured to detect, on the resource region, the control information transmitted from a network device.

In a fifth aspect, a network device is provided. The network device includes: a processor and a memory. The memory contains instructions executable by the processor, whereby the processor being adapted to cause the network device to perform the method according to the first aspect of the present disclosure.

In a sixth aspect, a terminal device is provided. The terminal device includes: a processor and a memory. The memory contains instructions executable by the processor, whereby the processor being adapted to cause the terminal device to perform the method according to the second aspect of the present disclosure.

According to various embodiments of the present disclosure, the control information is transmitted in the resource region crossing a plurality of subframes and/or a plurality of cells. As such, diversity gain of the transmission can be explored. In this way, the robustness of the downlink control channel is enhanced.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "network device" refers to a device in a wireless communication network via which a ten signal device accesses the network and receives services therefrom. The network device refers a base station (BS), an access point (AP), a Mobile Management Entity (MME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

Yet further examples of network device include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, UE, or other suitable device. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

The terminal device may support device-to-device (D2D) communication, for example by implementing a 3GPP standard for sidelink communication, and may in this case be referred to as a D2D communication device.

As yet another specific example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment that is capable of monitoring and/or reporting on its operational status or other functions associated with its operation.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
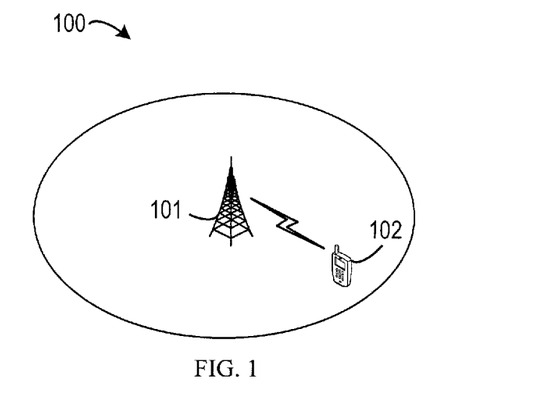
FIG. 1 shows a schematic diagram 100 of a wireless communication network.

Now some exemplary embodiments of the present disclosure will be described below with reference to the figures. Reference is first made to FIG. 1, which shows a schematic diagram 100 of a wireless communication network. There illustrates a network device 101 and a terminal device 102 in the wireless communication network. In the example of FIG. 1, the network device 101 provides service to the terminal device 102. The traffic between the network device 101 and the terminal device 102 may have a variety of types, such as URLLC, eMBB, mMTC, and so on. The network device 101 transmits control information about the traffic to the terminal device 102, for example, via Physical Downlink Control Channel (PDCCH) or enhanced PDCCH (ePDCCH).

It is to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations.

Conventionally, in LTE, PDCCH or ePDCCH are used to signal the downlink scheduling assignment in PDSCH and uplink scheduling grants. Each PDCCH/ePDCCH typically carries signaling for a single terminal, but also be used to address a group of terminals.

The PDCCH robustness is requested be higher than the traffic channel, like Physical Downlink Shared Channel (PDSCH) or Physical Uplink Shared Channel (PUSCH), since the assignment of the physical resource blocks of PDSCH is derived from the successful demodulation.

Figure 2:
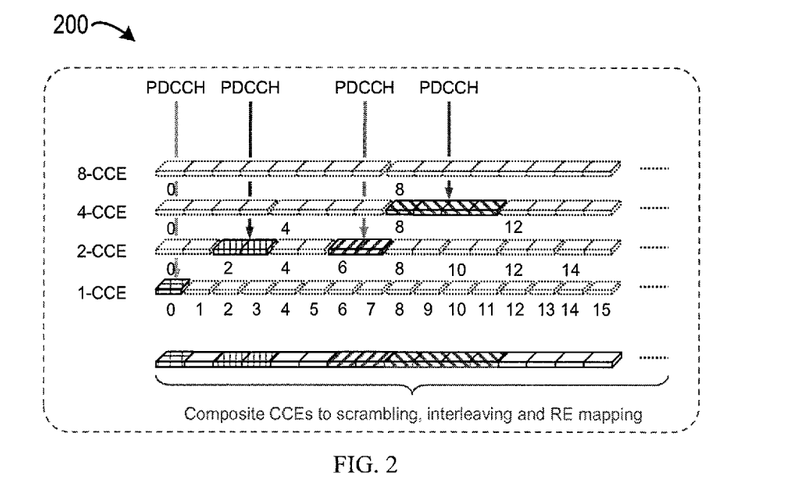
FIG. 2 shows a diagram 200 of mapping control information to control channel element(s) in accordance with an embodiment of the present disclosure.

FIG. 2 shows a diagram 200 of mapping control information to control channel element(s) in accordance with an embodiment of the present disclosure. As shown in FIG. 2, in the legacy LTE system, the control information (also referred to as "PDCCH" for discussion) are mapped to a control channel element (also referred to as "CCE" hereafter), which is a group of 36 resource elements (REs). During the mapping from PDCCH to CCE, different number of CCE can be used, in a way to implement link adaptation considering channel status of different UEs, so a single CCE or altogether 8 CCEs can be used for a single UE. Within the mapping (also referred to as "first-stage mapping" hereafter), different CCE aggregation levels would have different mapping position as shown in FIG. 2.

Figure 3:
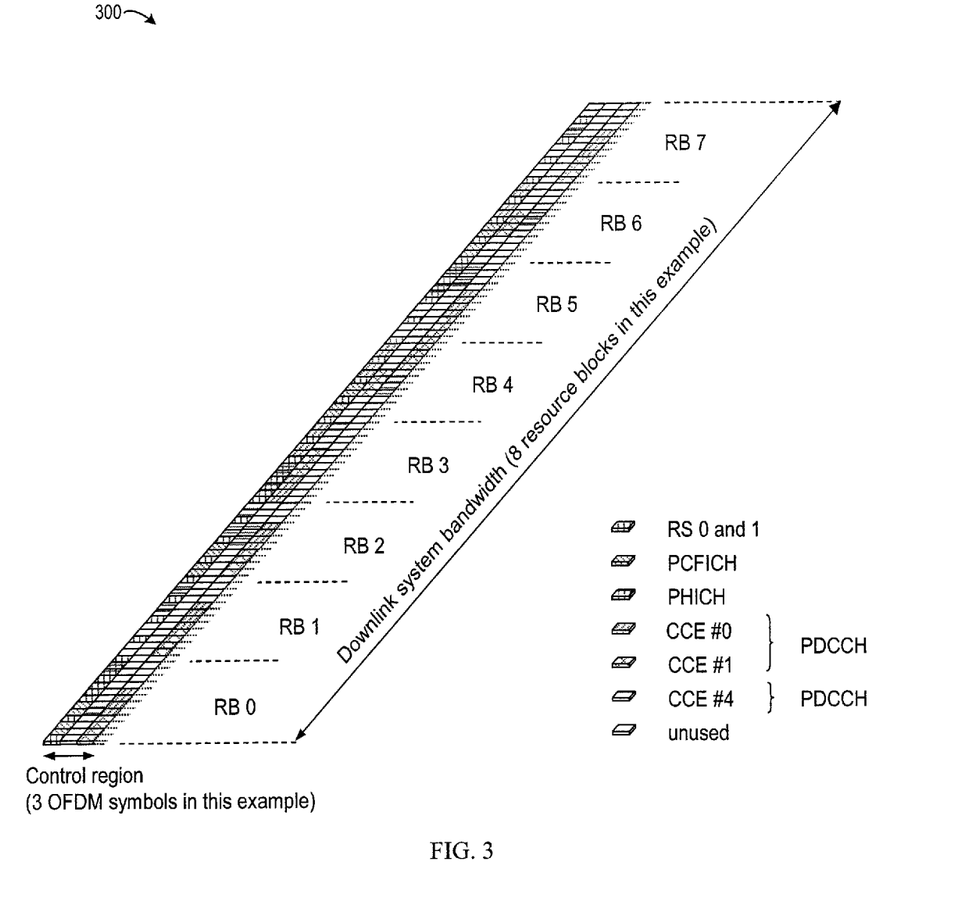
FIG. 3 shows a diagram 300 of mapping control channel element(s) to resource elements in accordance with an embodiment of the present disclosure.

After the PDCCH to CCE mapping, CCEs is to be mapped to physical resources. FIG. 3 shows a diagram 300 of mapping CCE(s) to REs in accordance with an embodiment of the present disclosure. In the example shown in FIG. 3, the CCE#0 is mapping to distributed REs. Such mapping (also referred to as "second-stage mapping" hereafter) may be done in a cell-specific way, in order to randomize inter-cell interference.

Generally, in the legacy LTE system, the generated PDCCH is mapped to the physical resources (limited to (e)PDCCH region) of a single subframe of one serving cell. With regard to mission critical communication, such as URLLC, Critical-machine type communication (C-MTC), and so on, robustness of downlink scheduling has been discussed and a key point is that the control channel reliability should exceed the target reliability in all dynamic scheduling scenarios. Thus, to satisfy the requirements on the data channel, i.e., BLER is not larger than $10^{-5}$ for URLLC, the BLER of the downlink control channel should not be larger than $10^{-5}$ error rate first. However, in the conventional channel design in LTE, even configured with the highest physical channel resources consumption, the BLER is hard to reach the requirement of $10^{-3}$ with the target SNR, let alone the stricter requirement of $10^{-5}$.

In order to solve the above and other potential problems, embodiments of the present disclosure provide solutions to map control information to more than one subframe and/or more than one cell to explore diversity gain. In accordance with embodiments of the present disclosure, control information, such as PDCCH, is arranged at a resource region crossing a plurality of subframes and/or a plurality of cells. As such, UE can detect the control information at the subframes and/or cells to explore diversity gain. With such "joint encoding/decoding" feature, the control channel reliability can be improved. As a result, robustness of the downlink control channel is enhanced.

Figure 4:
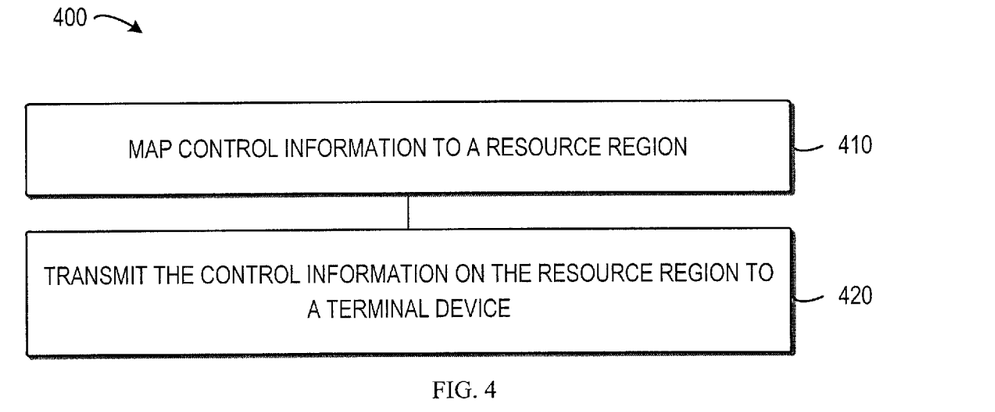
FIG. 4 shows a flowchart of a method 400 of resource mapping of control information in accordance with an embodiment of the present disclosure.

FIG. 4 shows a flowchart of a method 400 of resource mapping of control information in accordance with an embodiment of the present disclosure. With the method 400, the above and other potential deficiencies in the conventional approaches can be overcome. It would be appreciated by those skilled in the art that the method 400 may be implemented by a network device, such as a BS, a server, a controller or other suitable devices. The network device may be, for example, but not limited to, the network device 101 of FIG. 1.

The method 400 is entered at 410, where the network device maps control information to a resource region. In embodiments of the present disclosure, the network device serves the terminal device in a serving cell (also referred to as a "first cell" hereafter). The control information is associated with data to be transmitted at a subframe (also referred to as a "first subframe" hereafter) of the first cell. The control information may be carried by PDCCH (also referred to as "PDCCH information" for discussion) and may include a transmission format, resource allocation information, a grant of the uplink scheduling, power control information, and so on.

The resource region refers to resources allocated to the control information and crosses a plurality of subframes and/or a plurality of cells. The subframes may or may not include the first subframe, and the cells may or may not include the first cell. In accordance with embodiments of the present disclosure, the resource region may include REs in different subframes and/or different cells. For example, the resource region may include a first set of REs of a first subframe and a second set of REs of a second subframe of the first cell, wherein each set may include one or more REs. In another example, the resource region may include a first set of REs of a subframe of a first cell and a second set of REs of a second subframe of a second cell, wherein each set may include one or more REs. As such, the resource region includes REs belonging to a plurality of subframes and/or a plurality of cells.

In accordance with embodiments of the present disclosure, the mapping of control information to the resource region may be implemented as a two-stage mapping. In the first stage mapping, the control information may be mapped to one or more control channel elements. Next, in the second stage mapping, the one or more control channel elements may be mapped to REs of the first subframe and a second subframe of the first cell, and/or REs of subframes of the first cell and a second cell.

More specifically, in some embodiments, the control information may be mapped to one single control channel element. Then, the control channel element may be mapped to REs of a plurality of subframes, for example, a RE of the first subframe and another RE of the second subframe, wherein the first subframe and the second subframe may be subframes used by the same cell or different cells. In the case of the same cell, the first subframe and the second subframe is different. In the case of the different cells, the first subframe and the second subframe may be the same or different. It is to be understood that the REs is not limited to 2, but can be any suitable number. The above example is discussed just for purpose of illustration, rather than limitation.

Alternatively, in some embodiments, the control information may be mapped to a plurality of control channel elements. Then, the control channel elements may be mapped to REs of different subframes of the same cell (for example, the first cell), REs of subframes of different cells.

In addition, in some embodiments, in the first stage mapping, the control information may be mapped to the control channel element(s) based on a self-contained encoding scheme or a combined encoding scheme.

In an embodiment, the control channel elements may be mapped from the control information with the self-contained encoding scheme. According to the self-contained encoding scheme, symbols in the mapped control channel element in each subframe may be decoded independently by the terminal device to obtain the control information.

In an alternative embodiment, the control channel elements may be mapped from the control information with the combined encoding scheme. According to the combined encoding scheme, symbols in the mapped control channel element in all subframes need to be combined before being decoded to obtain the control information.

Still referring to FIG. 4, at 420, the network device transmits the control information on the resource region to a terminal device.

In view of the forgoing, the control information is transmitted in the resource region crossing a plurality of subframes and/or a plurality of cells. As such, diversity gain of the transmission can be explored. In this way, the robustness of the downlink control channel is enhanced.

In addition to the above, according to embodiments of the present disclosure, optionally, the mapping of the control information as discussed may be triggered under certain conditions. In an embodiment, the traffic type may act as a triggering factor. More specifically, the network device may determine the traffic type, that is, the type of the data to be transmitted, e.g., based on the QoS Class Identifier (QCI) configured for the traffic flow or traffic bearer. Upon determination of the type belonging to mission critical communication, for example, URLLC, the network device may map the control information to the resource region.

It is to be understood that the above example is only described for purpose of discussion, rather than suggesting any limitation. Those skilled in the art would appreciate that the mapping can be triggered by other suitable factors or in other suitable ways within the scope of the present disclosure.

In accordance with further embodiments of the present disclosure, for the terminal device, to decode the control information mapped as discussed above, it needs to know, for example, to which subframes the control information is mapped to, to which serving cells the control information is mapped to (the premise here is that the terminal device is active on that cell, e.g., due to carrier aggregation support), and so on. In this case, the network device may transmit information (also referred to as "mapping information" hereafter) about the mapping of the control information as discussed to the terminal device. Upon receipt of the mapping information, the terminal device may determine the resource region and thus detect the control information on the resource region.

In an embodiment, the mapping information transmitted by the network device via signaling, such as Radio Resource Control (RRC), Media Access Control (MAC) control element (CE), Physical Layer (PHY) signaling. The mapping information may include various information, for example, but not limited to, subframes to which the control information is mapped, cells to which the control information is mapped, control channel elements or resource elements of subframes to which the control information is mapped, control channel elements or resource elements of cells to which the control information is mapped, an encoding scheme used in the mapping, a numerology of the resource region, a search space of the resource region, and/or the like.

For example, the encoding scheme may indicate whether the self-contained encoding scheme or the combined encoding scheme is used. The numerology of the resource region may indicate subcarrier spacing, symbol length, and so on. Different traffic type may employ different numerologies. The search space of the resource region may indicate aggregation levels of CCEs, the size of a CCE, PDCCH candidates, and so on. The terminal device may detect the control information according to the search space of the resource region.

It is also to be understood that the above examples of the mapping information are only described for purpose of discussion, rather than suggesting any limitation. Those skilled in the art would appreciate that the mapping information can include other suitable information about the mapping within the scope of the present disclosure. Those skilled in the art would also appreciate that, in some alternative embodiments, the network device may not transmit the mapping information to the terminal device. In this case, the mapping information may be predefined at both the network device and the terminal device sides, for example, according to specifications, regulations, system requirements, and the like. Thus, the terminal device may detect the control information based on the predefined mapping information, without the necessity of additional signaling.

In some further alternative embodiments, there could be ambiguity in the signaling as discussed above. For example, the terminal device may know that 2 subframes/cells would be used for the mapping of the control information, yet not sure whether the current subframe/cell is the first one of the 2 subframes/cells. In this case, the terminal device may perform blind decoding to test multiple hypotheses.

Figure 5:
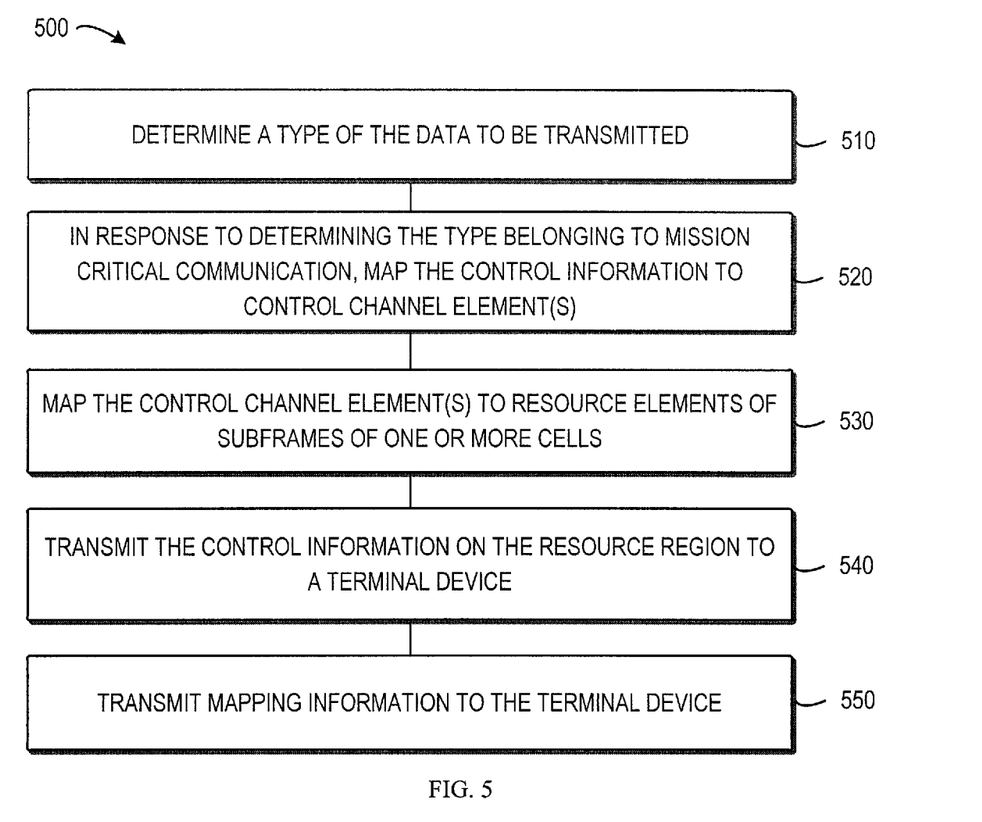
FIG. 5 shows a flowchart of a method 500 of resource mapping of control information in accordance with another embodiment of the present disclosure.

Reference is now made to FIG. 5, which shows a flowchart of a method 500 of resource mapping of control information in accordance with another embodiment of the present disclosure. It would be appreciated by those skilled in the art that the method 500 is an implementation of the method 400 and may be implemented at a network device. It is to be understood that the method 500 may be implemented in several ways as discussed above, and the method 500 is only one example instead of limitation.

The method 500 is entered at 510, where the network device determines a type of the data to be transmitted. At 520, in response to determining the type belonging to mission critical communication, the network device maps the control information to one or more control channel elements. At 530, the network device maps the control channel element(s) to resource elements of subframes of one or more cells. At 540, the network device transmits the control information on the resource region to a terminal device. At 550, the network device transmits mapping information to the terminal device.

Figure 6:
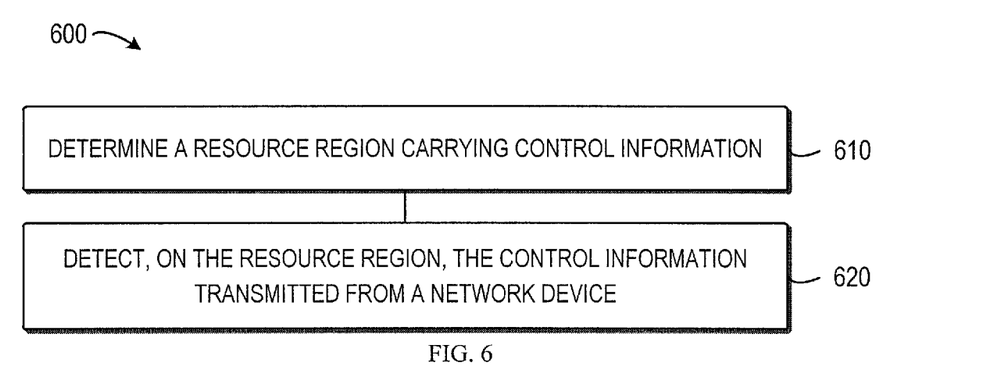
FIG. 6 shows a flowchart of a method 600 of resource mapping of control information in accordance with an embodiment of the present disclosure.

FIG. 6 shows a flowchart of a method 600 of resource mapping of control information in accordance with another embodiment of the present disclosure. With the method 600, the above and other potential deficiencies in the conventional approaches can be overcome. It would be appreciated by those skilled in the art that the method 600 may be implemented by a terminal device, such as a mobile phone, a UE or other suitable devices. The network device may be, for example, but not limited to, the terminal device 102 of FIG. 1.

The method 600 is entered at 610, where the terminal device determines a resource region carrying control information. The control information is associated with data transmitted at a first subframe of a first cell, and the resource region crosses a plurality of subframes and/or a plurality of cells.

In some embodiments, the terminal device may receive from the network device mapping information about at least one of: subframes to which the control information is mapped, cells to which the control information is mapped, control channel elements or resource elements of subframes to which the control information is mapped, control channel elements or resource elements of cells to which the control information is mapped, an encoding scheme used in the mapping, a numerology of the resource region, a search space of the resource region, and/or the like. Then, the terminal device may determine the resource region based on the mapping information.

At 620, the terminal device detects on the resource region the control information transmitted from a network device. With the knowledge of the resource region, the terminal device may detect the control information in a variety of ways. In some embodiments, the terminal device may perform blind decoding on the resource region until the control information is successfully detected.

In addition, in some embodiments, the terminal device may determine the encoding scheme employed by the network device, so as to perform the corresponding decoding. The encoding scheme may be predefined at both the network device and the terminal device, for example, including a self-contained encoding scheme and a combined encoding scheme. Thus, when detecting the control information, the terminal device may attempt to decode the control information with the self-contained encoding scheme and/or a combined encoding scheme. In this way, there is no need to notifying the terminal device the encoding scheme, and no overhead of signaling is introduced between the network device and the terminal device.

Alternatively, in some embodiments, the encoding scheme may be informed by the network device, for example, via RRC, MAC, or PHY signaling. Thus, when detecting the control information, the terminal device may decode the control information with the encoding scheme informed by the network device. In this way, the detecting can be performed in a more accurate and fast way.

Now more embodiments are provided below for discussing more details of the present disclosure. For purpose of discussion, the terminal device is referred to as UE, the network device is referred to as eNB, and the control information is referred to as PDCCH hereafter. It is to be understood that these are discussed for purpose of illustration, rather than suggesting any limitation.

As discussed, conventionally, in the legacy LTE system, the generated PDCCH is mapped to the physical resources (limited to (e)PDCCH region) of a single subframe of one serving cell. Differently, embodiments of the present disclosure map PDCCH to more than one subframe of the same serving cell, and/or another cell other than the serving cell, e.g., primary cell and secondary cells controlled by the same eNB. In this way, by exploring more dimensions, either in time domain or in frequency domain, more diversity gain can be achieved. As such, PDCCH reliability can be improved.

In one embodiment, the mapping from CCE to RE of each subframe/cell is not changed, but it is the mapping from PDCCH to CCE that is extended, i.e., compared to legacy system where PDCCH is mapped to CCE of a single subframe of the serving cell. For instance, the PDCCH may be mapped to CCE of other subframe(s) of the serving cell. As an alternative, the PDCCH may be mapped to CCE of subframes of other serving cells.

In another embodiment, the mapping from CCE to RE can be changed, so that not only to map to one subframe of one serving cell, here the CCE may be mapped to RE of other subframe(s) of the serving cell, or may be mapped to RE of subframes of other serving cells. In both cases, PDCCH may be mapped to CCEs in several ways.

In an example, PDCCH may be mapped to a single subframe/cell with the self-contained encoding scheme, i.e., can be decoded by its own. To implement this, the encoding scheme may be similar to legacy Physical Broadcast Channel (PBCH), or the chase combining of HARQ scheme can be used, so that information bits are mapped to the REs of each subframe/cell.

In another example, PDCCH may be not necessarily mapped to a single subframe/cell with the self-contained encoding scheme, so that an encoding scheme can be design without information bits distribution limits. For instance, PDCCH may be mapped with the combined encoding scheme. In this way, higher coding gain can be achieved.

For both examples, the UE may already start PDCCH decoding even if not all the related subframes of all related cells are received. In this way, lower latency can be achieved.

In order for the UE to know how to decode PDCCH generated as above, it has to know information about to which subframes the PDCCH is mapped to, to which serving cells the PDCCH is mapped to (in this case, the premise here is that the UE is active on that cell, e.g., due to carrier aggregation support), and/or the like. In an embodiment, the eNB may transmit the above information via signaling such as RRC, MAC CE, PHY signaling, so that the mapping can be static or dynamic. There may be ambiguity in this configuration signaling, e.g., the UE may know that 2 subframes/cells will would be used for joint encoding/decoding of PDCCH, yet not sure whether the current subframe/cell are the first or the second subframe/cell. In this case, it would be up to UE to do blind decoding, to test multiple hypotheses.

There may be different modes of PDCCH (with or without joint encoding/decoding as proposed above, or different numbers of subframes/cells where the joint encoding/decoding to be done) co-existing with each other, due to the different requirement of PDCCH reliability of different traffic types, i.e., C-MTC and non-C-MTC traffic, or different channel status of different UEs. There may be a variety of ways to differentiate various modes of PDCCH.

In some embodiments, the different modes of PDCCH may be put onto different numerologies, so that PDCCH for C-MTC is put onto numerologies with shorter symbol length, which benefits from joint encoding/decoding feature, while PDCCH for non-C-MTC is put onto numerologies with longer symbol length, without benefit from joint encoding/decoding feature.

Alternatively, in some embodiments, the different modes of PDCCH may can be put onto different search space, so that PDCCH with and without joint encoding feature can happen at separated search spaces, although on the same numerologies.

As a further alternative, in some embodiments, the different modes of PDCCH may happen at same search space, and it is up to UE to try both hypothesis, to decode PDCCH on single subframe (to decode PDCCH on subframe N of serving cell M only), or joint decoding PDCCH on multiple subframes/cells (to jointly decode PDCCH on subframe N and N', or of serving cell M and M').

In addition, the joint encoding/decoding feature proposed in embodiments of the present disclosure can improve PDCCH reliability, without introducing too much blind decoding effort. Table 1 shows PDCCH blind detection attempts in legacy LTE. In the example of Table 1, based on search space of the legacy LTE, the number of the PDCCH blind detection attempts (that is, the sum of the PDCCH candidates) is 44 (for each PDCCH candidates, different DCI formats is to be tested, so altogether 22*2 (DCI format types)=44 blind detection attempts).

TABLE 2

|  | Aggregation levels | Size (in CCE) | PDCCH candidates |
|---|---|---|---|
| USS (UE specific search space) | 1 | 6 | 6 |
|  | 2 | 12 | 6 |
|  | 4 | 8 | 2 |
|  | 8 | 16 | 2 |
| CSS (common search space) | 4 | 16 | 4 |
|  | 8 | 16 | 2 |

From Table 1, it can be seen that the PDCCH blind detection attempts may be limited by limiting the enhanced PDCCH mode to: limited aggregation levels, e.g., 4 and 8; limited size for each aggregation levels, e.g., 16 CCE size for 8 aggregation level and 8 CCE size for 4 aggregation level; limited format of DCI (or reusing the existing format), e.g., assume a new DCI format is used.

In some embodiments, the resulted PDCCH blind detection attempts may be calculated based on the assumptions above. The search space is limited to UE specific search space (USS). The search space is assumed to be mapped to 2 subframes (same or different serving cell), where the UE may attempt to perform joint decoding of PDCCH both limited to the current subframe, and combining it with another subframe. So finally it would be 44+4*2=52 blind detection attempts.

TABLE 2

|  | Aggregation levels | Size (in CCE) | PDCCH candidates |
|---|---|---|---|
| USS (UE specific search space) | 1 | 6 | 6 |
|  | 2 | 12 | 6 |
|  | 4 | 8 + 8 | 2 + 2 |
|  | 8 | 16 + 16 | 2 + 2 |
| CSS (common search space) | 4 | 16 | 4 |
|  | 8 | 16 | 2 |

In view of the forgoing, the joint encoding/decoding feature proposed in embodiments of the present disclosure can enhance the robustness of the downlink control channel, without introducing too much blind decoding effort.

It is to be understood that, the above examples or embodiments are discussed for illustration, rather than limitation. Those skilled in the art would appreciate that there may be many other embodiments or examples within the scope of the present disclosure.

Figure 7:
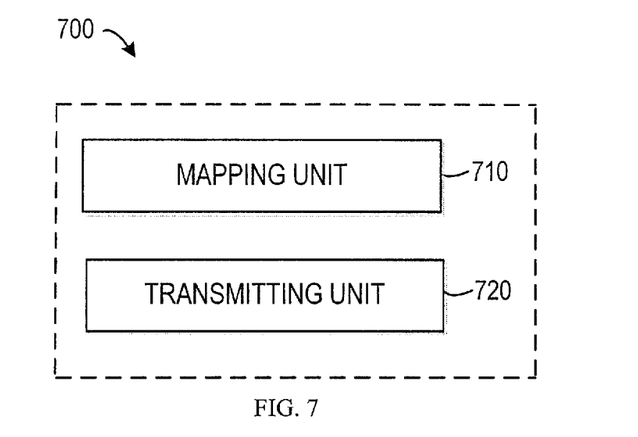
FIG. 7 shows a block diagram of an apparatus 700 implemented at a network device in accordance with an embodiment of the present disclosure.

Now reference is made to FIG. 7, which shows a block diagram of an apparatus 700 in accordance with an embodiment of the present disclosure. It would be appreciated that the apparatus 700 may be implemented at a network device or any other suitable device.

As shown, the apparatus 700 includes a mapping unit 710 and a transmitting unit 720. The mapping unit 710 is configured to map control information to a resource region, the control information being associated with data to be transmitted at a first subframe of a first cell, and the resource region crossing a plurality of subframes and/or a plurality of cells. The transmitting unit 720 is configured to transmit the control information on the resource region to a terminal device.

In an embodiment, the mapping unit 710 may be further configured to: map the control information to one or more control channel elements; and map the one or more control channel elements to at least one of: resource elements of the first subframe and a second subframe of the first cell, and resource elements of subframes of the first cell and a second cell.

In an embodiment, the mapping unit 710 may be further configured to: map the control information to the control channel elements based on a self-contained encoding scheme or a combined encoding scheme.

In an embodiment, the mapping unit 710 may be further configured to: determine a type of the data to be transmitted; and in response to determining the type belonging to mission critical communication, map the control information to the resource region.

In an embodiment, the transmitting unit 720 may be further configured to: transmit, to the terminal device, mapping information about at least one of: subframes to which the control information is mapped, cells to which the control information is mapped, control channel elements or resource elements of subframes to which the control information is mapped, control channel elements or resource elements of cells to which the control information is mapped, an encoding scheme used in the mapping, a numerology of the resource region, and a search space of the resource region.

Figure 8:
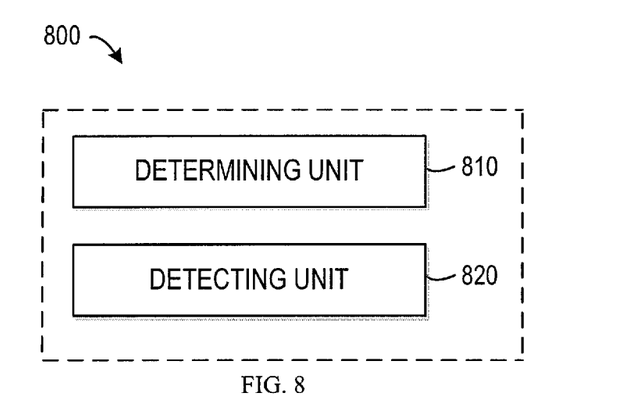
FIG. 8 shows a block diagram of an apparatus 800 implemented at a terminal device in accordance with an embodiment of the present disclosure.

Now reference is made to FIG. 8, which shows a block diagram of an apparatus 800 in accordance with an embodiment of the present disclosure. It would be appreciated that the apparatus 800 may be implemented at a terminal device or any other suitable device.

As shown, the apparatus 800 includes a determining unit 810 and a detecting unit 820. The determining unit 810 is configured to determine a resource region carrying control information, the control information being associated with data transmitted at a first subframe of a first cell, and the resource region crossing a plurality of subframes and/or a plurality of cells. The detecting unit 820 is configured to detect, on the resource region, the control information transmitted from a network device.

In an embodiment, the apparatus 800 may further include a receiving unit configured to receive, from the terminal device, mapping information about at least one of: subframes to which the control information is mapped, cells to which the control information is mapped, control channel elements or resource elements of subframes to which the control information is mapped, control channel elements or resource elements of cells to which the control information is mapped, an encoding scheme used in the mapping, a numerology of the resource region, and a search space of the resource region. The determining unit 810 may be further configured to: determine the resource region based on the mapping information.

In an embodiment, the detecting unit 820 may be configured to: decode the control information based on a self-contained encoding scheme or a combined encoding scheme.

It should be appreciated that components included in the apparatus 700 correspond to the operations of the methods 400 and 500, and components included in the apparatus 800 correspond to the operations of the method 600. Therefore, all operations and features described above with reference to FIGS. 4 and 5 are likewise applicable to the components included in the apparatus 700 and have similar effects, and all operations and features described above with reference to FIG. 6 are likewise applicable to the components included in the apparatus 800 and have similar effects. For the purpose of simplification, the details will be omitted.

The components included in the apparatuses 700 and 800 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the apparatuses 700 and 800 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In accordance with embodiments of the present disclosure, there is provided an apparatus implemented at a network device. The apparatus includes: means for mapping control information to a resource region, the control information being associated with data to be transmitted at a first subframe of a first cell, and the resource region crossing a plurality of subframes and/or a plurality of cells; and means for transmitting the control information on the resource region to a terminal device.

In an embodiment, the means for mapping control information to a resource region comprises: means for mapping the control information to one or more control channel elements; and means for mapping the one or more control channel elements to at least one of: resource elements of the first subframe and a second subframe of the first cell, and resource elements of subframes of the first cell and a second cell.

In an embodiment, the means for mapping the control information to control channel elements comprises: means for mapping the control information to the control channel elements based on a self-contained encoding scheme or a combined encoding scheme.

In an embodiment, the apparatus may further comprise means for determining a type of the data to be transmitted; and means for, in response to determining the type belonging to mission critical communication, mapping the control information to the resource region.

In an embodiment, the apparatus may further comprise: means for transmitting, to the terminal device, mapping information about at least one of: subframes to which the control information is mapped, cells to which the control information is mapped, control channel elements or resource elements of subframes to which the control information is mapped, control channel elements or resource elements of cells to which the control information is mapped, an encoding scheme used in the mapping, a numerology of the resource region, and a search space of the resource region.

In accordance with embodiments of the present disclosure, there is provided an apparatus implemented at a terminal device. The apparatus includes: means for determining a resource region carrying control information, the control information being associated with data transmitted at a first subframe of a first cell, and the resource region crossing a plurality of subframes and/or a plurality of cells; and means for detecting, on the resource region, the control information transmitted from a network device.

In an embodiment, the means for determining a resource region carrying control information comprises: means for receiving, from the terminal device, mapping information about at least one of: subframes to which the control information is mapped, cells to which the control information is mapped, control channel elements or resource elements of subframes to which the control information is mapped, control channel elements or resource elements of cells to which the control information is mapped, an encoding scheme used in the mapping, a numerology of the resource region, and a search space of the resource region; and means for determining the resource region based on the mapping information.

In an embodiment, the means for detecting the control information comprises: means for decoding the control information based on a self-contained encoding scheme or a combined encoding scheme.

Figure 9:
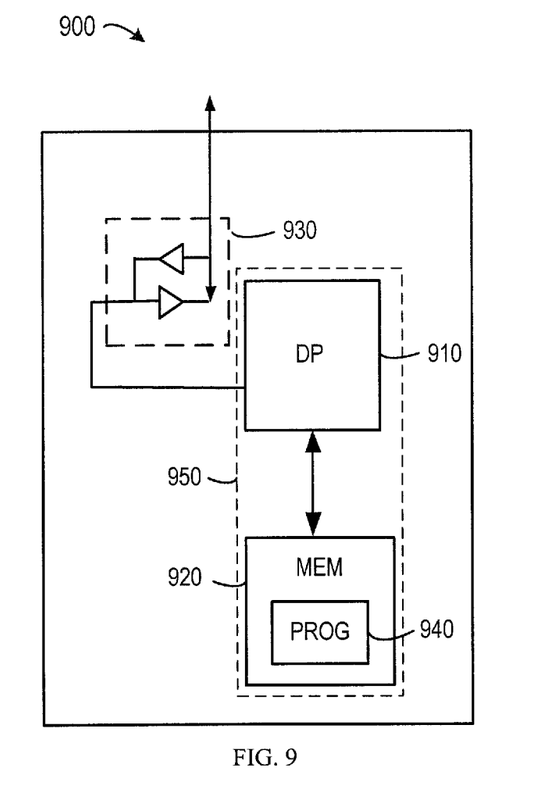
FIG. 9 shows a simplified block diagram 900 of a device that is suitable for use in implementing embodiments of the present disclosure.

FIG. 9 shows a simplified block diagram of a device 900 that is suitable for implementing embodiments of the present disclosure. It would be appreciated that the device 900 may be implemented as at least a part of, for example, the network device 101 or the terminal device 102.

As shown, the device 900 includes a communicating means 930 and a processing means 950. The processing means 950 includes a data processor (DP) 910, a memory (MEM) 920 coupled to the DP 910. The communicating means 930 is coupled to the DP 910 in the processing means 950. The MEM 920 stores a program (PROG) 940. The communicating means 930 is for communications with other devices, which may be implemented as a transceiver for transmitting/receiving signals.

In some embodiments where the device 900 acts as a network device, the processing means 950 may be configured to map control information to a resource region, the control information being associated with data to be transmitted at a first subframe of a first cell, and the resource region crossing a plurality of subframes and/or a plurality of cells; and the communicating means 930 may be configured to transmit the control information on the resource region to a terminal device. In some other embodiments where the device 900 acts as a terminal device, the processing means 950 may be configured to determine a resource region carrying control information, and the communicating means 930 may be configured to detect, on the resource region, the control information transmitted from a network device.

The PROG 940 is assumed to include program instructions that, when executed by the associated DP 910, enable the device 900 to operate in accordance with the embodiments of the present disclosure, as discussed herein with the method 400, 500 or 600. The embodiments herein may be implemented by computer software executable by the DP 910 of the device 900, or by hardware, or by a combination of software and hardware. A combination of the data processor 910 and MEM 920 may form processing means 950 adapted to implement various embodiments of the present disclosure.

The MEM 920 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 900, there may be several physically distinct memory modules in the device 900. The DP 910 may be of any type suitable to the local technical environment, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. The machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a network device, comprising:
mapping control information to a resource region, the control information being associated with data to be transmitted at a first subframe of a first cell, and the resource region crossing a plurality of cells; and
transmitting the control information on the resource region to a terminal device, wherein
mapping control information to a resource region comprises: mapping the control information to one or more control channel elements and mapping the one or more control channel elements to resource elements of subframes of the first cell and a second cell, and
mapping the control information to control channel elements comprises:
mapping the control information to the control channel elements based on a self-contained encoding scheme, wherein symbols in the mapped control channel element in each subframe may be decoded independently by the terminal device to obtain the control information, or
mapping the control information to the control channel elements based on a combined encoding scheme, wherein symbols in the mapped control channel element in all subframes are combined before being decoded to obtain the control information.

2. The method of claim 1, further comprising:
determining a type of the data to be transmitted; and
in response to determining the type belonging to mission critical communication, mapping the control information to the resource region.

3. The method of claim 1, further comprising:
transmitting, to the terminal device, mapping information about at least one of:
subframes to which the control information is mapped,
cells to which the control information is mapped,
control channel elements or resource elements of subframes to which the control information is mapped,
control channel elements or resource elements of cells to which the control information is mapped,
an encoding scheme used in the mapping,
a numerology of the resource region, and
a search space of the resource region.

4. A network device, comprising:
a processor and a memory, the memory containing program instructions executable by the processor, the processor being configured to cause the network device to perform the method of claim 1.

5. A method implemented at a terminal device, comprising:
determining a resource region carrying control information, the control information being associated with data transmitted at a first subframe of a first cell, and the resource region crossing a plurality of cells; and
detecting, on the resource region, the control information transmitted from a network device, wherein
detecting the control information comprises:
decoding the control information based on a self-contained encoding scheme, wherein symbols in the mapped control channel element in each subframe may be decoded independently by the terminal device to obtain the control information, or
decoding the control information based on a combined encoding scheme, wherein symbols in the mapped control channel element in all subframes are combined before being decoded to obtain the control information.

6. The method of claim 5, wherein determining a resource region carrying control information comprises:
receiving, from the network device, mapping information about at least one of:
subframes to which the control information is mapped,
cells to which the control information is mapped,
control channel elements or resource elements of subframes to which the control information is mapped,
control channel elements or resource elements of cells to which the control information is mapped,
an encoding scheme used in the mapping,
a numerology of the resource region, and
a search space of the resource region; and
determining the resource region based on the mapping information.

* * * * *